Patented Mar. 2, 1943

2,312,387

UNITED STATES PATENT OFFICE 2,312,387

FROTH FLOTATION OF ACIDIC MINERALS

Ludwig Jacob Christmann, Yonkers, N. Y., and David Walker Jayne, Jr., Old Greenwich, and Stephen E. Erickson, Springdale, Conn., assignors to American Cyanamid Company, New York, N. Y., a corporation of Maine No Drawing. Application September 4, 1940, Serial No. 355,367

3 Claims. (Cl. 209—166)

The present invention relates to mineral concentration. More particularly it relates to a new class of reagents for selectively separating acidic minerals from ore materials.

In accordance with this invention natural ores or artificial materials comprising mixtures of acidic minerals with other mineral constituents are subjected to a separation or concentration process in the presence of a promoter, said promoter being the condensation products obtained by reacting a polyalkylene polyamine with talloel or with mixtures of talloel and fatty acids, and salts of such products, to effect separation of the acidic minerals from the other ore constituents. Particularly this invention relates to the use of the reaction products of polyalkylene polyamines with talloel, either as the free base or as the substantially water-soluble salt of such a product, as promoters for acidic minerals in froth flotation, film flotation, stratification, agglomeration, tabling and related mineral separation processes. While the invention is not limited to any particular ore concentrating process or to any particular ore, its most important field of usefulness is in connection with the froth flotation processes of separating silica or silicate minerals, such as mica, from nonmetallic ores, such as limestone, bauxite, barytes, ilmenite, calcite and the like, and especially phosphate minerals.

The compounds that have been found to have a selective filming attraction for acidic ores and which are useful for carrying out this invention include broadly the reaction products of polyalkylene polyamines with talloel or mixtures of talloel and fatty acids. The compounds are not limited to those produced by reacting any particular grade of talloel with the polyalkylene polyamines. This is an advantage of the present invention because it permits the use of talloel recovered or separated, by any of the commercial processes, from the black liquor soap by-product produced in the manufacture of paper by the sulfate process. Various methods for recovering talloel from the black liquor soap are known in the art which result in the production of talloel having variable acid content. In general talloel is comprised of a mixture of rosin acids, fatty acids, lignin and unsaponifiable matter. Crude talloel usually contains higher percentages of lignin and unsaponifiable matter than purified talloel which may contain relatively small amounts of lignin and unsaponifiable matter and is composed chiefly of a mixture of resin acids and fatty acids.

The compounds are not limited to those produced by reacting any particular molecular ratio of the polyalkylene polyamines with talloel. Hence, when one mol. of polyalkylene polyamine is reacted with one mol. of talloel, the mono-acidyl derivative is produced. The product so produced is in all probability a mixture of the mono-acidyl polyalkylene polyamine fatty acid derivative and mono-acidyl polyalkylene polyamine resin acid derivatives. When one mol. of polyalkylene polyamine is reacted with two mols. of talloel a product is produced which is a mixture most probably composed of di-acidyl polyalkylene polyamine fatty acid compounds, di-acidyl polyalkylene polyamine resin acid compounds, and di-acidyl polyalkylene polyamine compounds in which one acidyl radical is a fatty acid radical and in which the other acid radical is a rosin acid. Preferably the reagents of the present invention are produced by first determining the saponification value of the talloel to be used and then reacting the talloel with a polyalkylene polyamine or a mixture of polyalkylene polyamines under conditions which will result in the production of either the mono-acidyl or di-acidyl derivatives or they may be crude mixtures which may contain an excess of either the polyalkylene polyamine or talloel substances. Satisfactory products are also produced by adding fatty acids or fatty acid glycerides to the talloel. This is of particular advantage in connection with crude talloel. For example, crude talloel may be diluted with a fatty acid such as palmitic, oleic, and the like, or with a fatty acid glyceride such as those present in coconut oil or cottonseed oil and the resulting mixture reacted with a polyalkylene polyamine or a mixture of polyalkylene polyamines to produce either the mono-acidyl or di-acidyl reaction products or mixtures thereof. These compounds are in general surface active and basic in character.

A satisfactory method of preparing the above reagents comprises reacting talloel with a polyalkylene polyamine at a temperature of about 230–240° C. until the reaction is complete. As pointed out heretofore, talloel from various sources varies in its saponification value and it is usually desirable to determine this value of the talloel which can then be used as the basis for determining the amount of talloel needed to produce the mono-acidyl or di-acidyl derivatives as the case may be. Satisfactory products have also been produced by reacting a mixture of polyethylene polyamines with talloel of various grades at a temperature of about 240° C. as follows:

4.5 parts talloel (5% rosin acids) with 10 parts polyethylene polyamines
4 parts talloel (34-38% rosin acids) with 10 parts polyethylene polyamines
4 parts talloel (43.5% rosin acids) with 10 parts polyethylene polyamines
2.6 parts talloel (31-32% rosin acids) with 10 parts polyethylene polyamines
3.8 parts talloel (31-32% rosin acids) with 10 parts polyethylene polyamines
5.1 parts talloel (31-32% rosin acids) with 10 parts polyethylene polyamines The above products are usually homogeneous, viscous pastes which are soluble in aliphatic alcohols or other organic solvents. They combine with acids, such as formic, acetic, hydrochloric and the like, to yield salts which are soluble in water.

Representative polyalkylene polyamines which may be employed in condensing with talloel or mixtures of talloel with fatty acids are diethylene triamine, dipropylene triamine, dibutylene triamine, triethylene tetramine, tetraethylene pentamine, or mixtures of any two or more of such polyamines either as relatively pure compounds or crude mixtures. In general they are polyamines the different amino groups of which are separated from one another by a hydrocarbon radical containing from 2 to 12 carbon atoms. It is an advantage of the present invention that relatively crude mixtures of the various polyamines may be used for reacting with talloel or mixtures of talloel with fatty acids or fatty acid glycerides which results in the production of reagents at a lower cost than possible by using the purified polyamines.

In the above-described processes the talloel may be in part substituted by substances such as fatty acids or fatty acid glycerides which may be saturated, unsaturated, or contain hydroxy groups. Representative acids and fatty acid glycerides include lauric, palmitic, stearic, oleic, ricinoleic, capric, and myristic, mixtures of such acids or glycerides and especially mixtures of the fatty acids or glycerides found in the fats and oils of either vegetable or animal sources, such as those in coconut oil, palm oil, palm kernel oil, cottonseed oil, corn oil, linseed oil, olive oil, peanut oil, fish oils, and the like.

The promoter action of the reagents of the present invention will, of course, vary with different ore minerals and with the different polyalkylene polyamine talloel condensation products or salts used. It is an advantage of the invention, however, that good results are obtained when the compounds are used in the form of their water-soluble salts, for example, the acetates. However, it is not necessary to use the water-soluble salts, and the compound in the form of the free base may be used provided satisfactory dispersion and distribution is effected. In froth flotation operations dispersion may be effectively obtained by feeding an alcoholic solution of the compound into the flotation circuit or by the use of emulsions containing the reagent dispersed therein.

The reagents of the present invention are effective promoters or collecting agents for acidic ore materials generally and said acidic materials may be either worthless gangue or valuable ore constituents. The most important use, however, is in connection with the froth flotation of silica from non-metallic ores in which the siliceous gangue may represent a much smaller proportion of the ore rather than metallic and sulfide ores in which the gangue usually represents the major proportion of the ore. Representative acidic ore materials are the feldspars, quartz, pyroxenes, the spinels, biotite, muscovite, clays, and the like.

While as stated heretofore the present invention is not limited to the treatment of any particular ore materials, it has been found to be well suited for froth flotation of silica from phosphate rock, and this is a preferred embodiment of the invention. In the processes of removing silica from phosphate rock the conditions are such that practically complete removal of the silica must be accomplished in order to produce a salable phosphate material. It is therefore an advantage of this invention that our reagents not only effect satisfactory removal of the silica but are economical in amounts used. The quantities required range from 0.1 pound to 2.0 pounds per ton of ore depending upon the particular ore and the particular reagent. The invention is not, however, limited to the use of such quantities.

These reagents have also been successfully used for the flotation of feldspar from quartz and for the flotation of mica from quartz and calcite.

The reagents of the present invention may be used alone or in mixtures with other promoters. They may likewise be used in conjunction with other cooperating materials such as conditioning reagents, activators, frothing reagents, depressing reagents, dispersing reagents, oily materials such as hydrocarbon oils, fatty acids or fatty acid esters.

These new reagents are also adaptable for use in any of the ordinary concentrating processes such as film flotation, tabling, and particularly in froth flotation operations. The ore concentrating processes employed will depend upon the particular type or kind of ore which is being processed. For example, in connection with phosphate rock, relatively coarse, phosphate-bearing material, for example 28 mesh or larger, can be economically concentrated by using these reagents in conjunction with other materials such as fuel oil or pine oil and subjecting to concentration by the use of tables or by film flotation. The —28 mesh phosphate rock material is best concentrated by means of froth flotation employing these improved silica promoters.

When the reagents of the present invention are employed as promoters in the froth flotation of silica from phosphate rock the conditions may be varied in accordance with procedures known to those skilled in the art. The reagent may be employed in the form of aqueous solutions, emulsions, mixtures, or solutions in organic solvents such as alcohol and the like. The reagents may be introduced into the ore pulp in the flotation cell without prior conditioning or they may be conditioned with the ore pulp prior to the actual concentration operation. They may also be stage fed into the flotation circuit.

Other improved phosphate flotation features which are known may be utilized in connection with the present invention, such as the very complete removal of the slimes prior to flotation which is an aid to better results as pointed out in the Erickson application Serial No. 325,011, filed March 20, 1940, and the Mead and Maust application Serial No. 320,121, filed February 21, 1940, which describes a process for classifying and desliming phosphate flotation feed by means of a hindered settling classifier and which deslimed feed is well suited for treatment in accordance with this invention.

The invention will be further illustrated by the following specific example which is an illustration of the preferred embodiments thereof, but it is not intended to limit the invention thereby.

Example

Flotation tests as follows were made on a sample of Florida phosphate ore from the Old Colony mine near Brewster. This ore material which was essentially −48 +200 mesh material was agitated and "scrubbed" with water to break up the clay balls. The slimes were subsequently removed by decantation and repeated washing until the ore material was substantially free of slimes.

Separate 600 gram samples of deslimed flotation feed were diluted to 22% solids with water and transferred to a laboratory size Fagergren flotation machine. The particular reagent or reagent combination was then added and conditioned with the pulp for 3 seconds. Air was admitted to the machine and the resultant concentrate was skimmed off for 2 minutes. The flotation test products were then filtered, dried, weighed, and assayed. The metallurgical data obtained in these tests are presented in the table. The results of the flotation tests given in the table are the averages of at least two duplicate flotation tests, the results of which check within the limits of reasonable experimental error.

some cases it may also be desirable to add from .1 to 1 pound per ton of ore of a frother such as pine oil or a higher aliphatic alcohol frother. The pulp is conditioned with the reagent combination for a few seconds, air is then admitted to the machine, and the resulting froth concentrate removed from the cell. The phosphate values remain in the tails. The results obtained by the use of the reagent mixture described above are superior in most instances to results obtained when compared to the recovery of phosphate values by the flotation of phosphate particles from the quartz in the soap or fatty acid flotation processes. In the above-described process similar results are obtained when the promoter employed is the reaction product of mixed polyethylene polyamines and talloel diluted with palm kernel oil, talloel diluted with coconut oil, or talloel diluted with a fatty acid such as oleic.

While the above example relates specifically to the flotation of silica from phosphate rock, the present invention is not limited to such operations and the reagents are useful in the treatment of various other types of ore materials wherein it is desirable to remove acidic minerals in the froth. For example, the reagents are useful in the treatment of the rake sands from the tailings produced in cement plant operations. In this particular instance the rake sands are treated by flotation to remove part of the alumina which is present in the form of mica and the removal of silica is not desirable. Our reagents have been found to be useful in such flotation operations. The reagent may also be used for

Table

| Test No. | Reaction product of talloel and polyethylene polyamines | | Feed | | Tailing (phosphate product) | |
|---|---|---|---|---|---|---|
| | | | Promoter | Higher alcohol frother | Weight | Insol. |
| | | | Lb./ton | Lb./ton | Per cent | Per cent |
| 1 | Talloel (5% rosin acids), 4.5 parts | Polyamine, 10 parts | 0.60 | 0.80 | 39.46 | 4.18 |
| 2 | Talloel (34-38% rosin acids), 4 parts | do | 0.60 | 0.80 | 37.81 | 2.47 |
| 3 | Talloel (43.5% rosin acids), 4 parts | do | 0.60 | 0.80 | 37.13 | 5.95 |
| 4 | Talloel (31-32% rosin acids), 2.6 parts | do | 0.60 | 0.80 | 28.23 | 2.75 |
| 5 | Talloel (31-32% rosin acids), 3.8 parts | do | 0.60 | 0.80 | 35.50 | 2.37 |
| 6 | Talloel (31-32% rosin acids), 5.1 parts | do | 0.60 | 0.80 | 40.50 | 3.75 |

The reagents were fed to the flotation circuit in the above tests in the form of emulsions.

An analysis of the metallurgical data found in the table shows that in most tests the phosphate product is of a satisfactory marketable grade, and that the phosphate product is in some instances a better grade than that currently produced by the flotation of phosphate particles from the quartz.

In using the silica promoters of the present invention comprising the condensation products obtained by reacting talloel diluted with a fatty acid or a fatty acid glyceride, at an elevated temperature, with mixed polyethylene polyamines for the recovery of values from phosphate ores by froth flotation the process may be practiced as follows:

For example, a Florida pebble phosphate flotation feed, consisting mainly of tricalcium phosphate and silica and in which the particle size is preferably −28 mesh material, is diluted to a pulp density of about 22% solids in a Fagergren flotation cell. From .2 to 2 pounds per ton of ore of a promoter comprising the reaction product of mixed polyethylene polyamines and talloel diluted with cottonseed oil is added to the pulp in the form of a solution in isopropyl alcohol. In the flotation of silica from iron ores containing magnetite, limonite and quartz, and in tests conducted on this type of ore the rough tailing resulting from the flotation of silica containing both magnetite and limonite, assayed much higher in iron than concentrates produced by the conventional soap flotation of the iron minerals.

What we claim is:

1. In ore concentrating processes of separating acidic ore materials from non-metallic ore constituents the process which comprises carrying out the concentration operation in the presence of a promoter for the acidic ore material, said promoter being chosen from the group consisting of the reaction products of polyalkylene polyamines, represented by the following general formula:

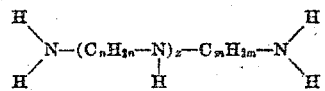

in which $n$, $m$, and $x$ are small whole numbers, with talloel and salts thereof.

2. In the froth flotation process of separating phosphate ore values from acidic siliceous gangue, the step which comprises subjecting the ore to froth flotation in the presence of a reagent chosen from the groups consisting of the reaction products of polyalkylene polyamines, represented by the following general formula:

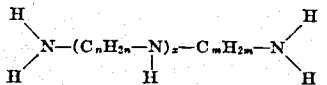

in which $n$, $m$, and $x$ are small whole numbers, with talloel and salts of such reaction products.

3. In the froth flotation process of separating phosphate ore values from acidic silicious gangue, the step which comprises subjecting the ore to froth flotation in the presence of a reagent chosen from the groups consisting of the reaction products of mixed polyethylene polyamines, represented by the following general formula:

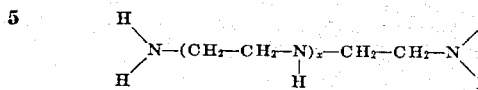

in which $x$ is a small whole number, with talloel and the salts of such reaction products.

LUDWIG JACOB CHRISTMANN.
DAVID WALKER JAYNE, JR.
STEPHEN E. ERICKSON.